UNITED STATES PATENT OFFICE.

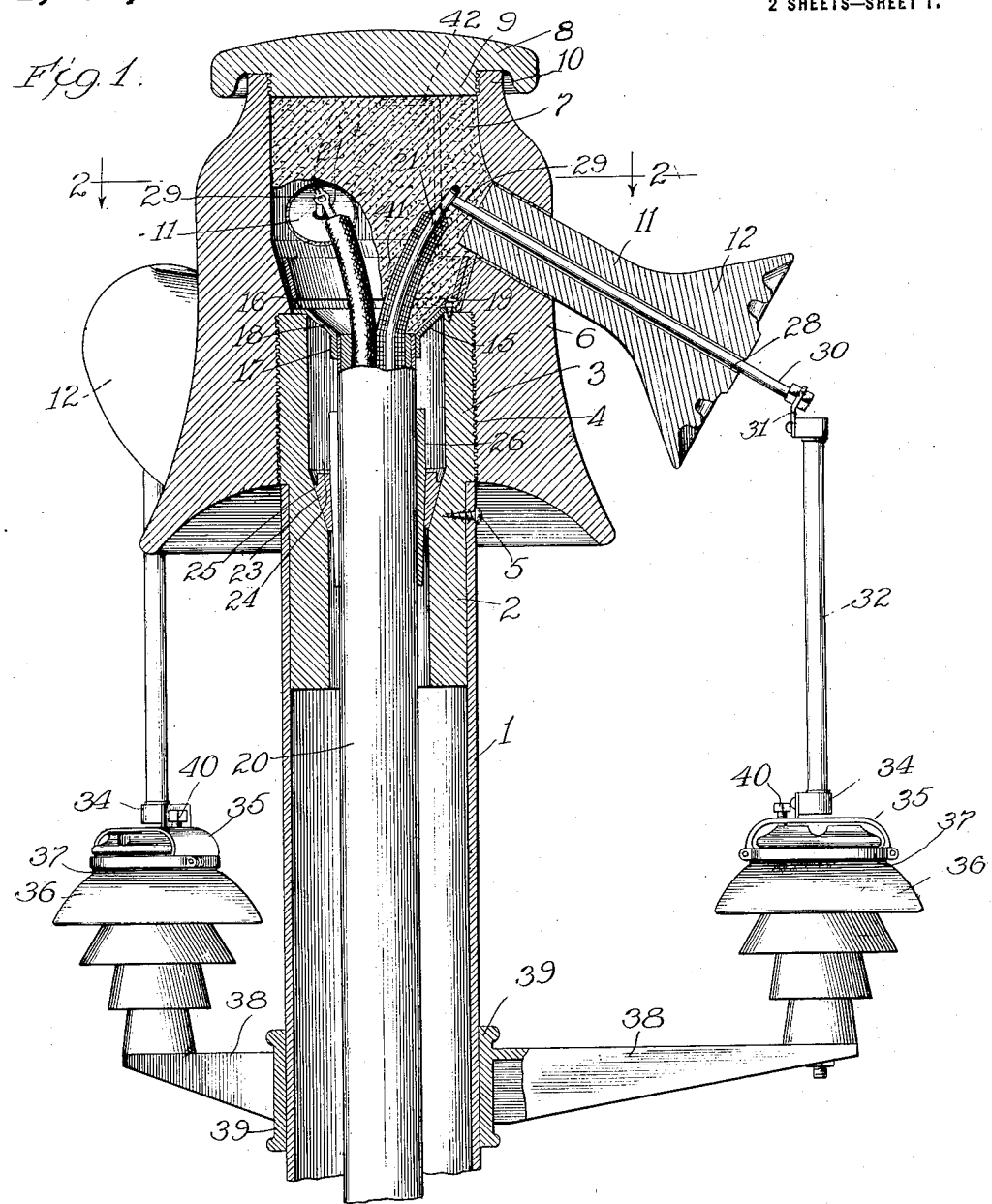

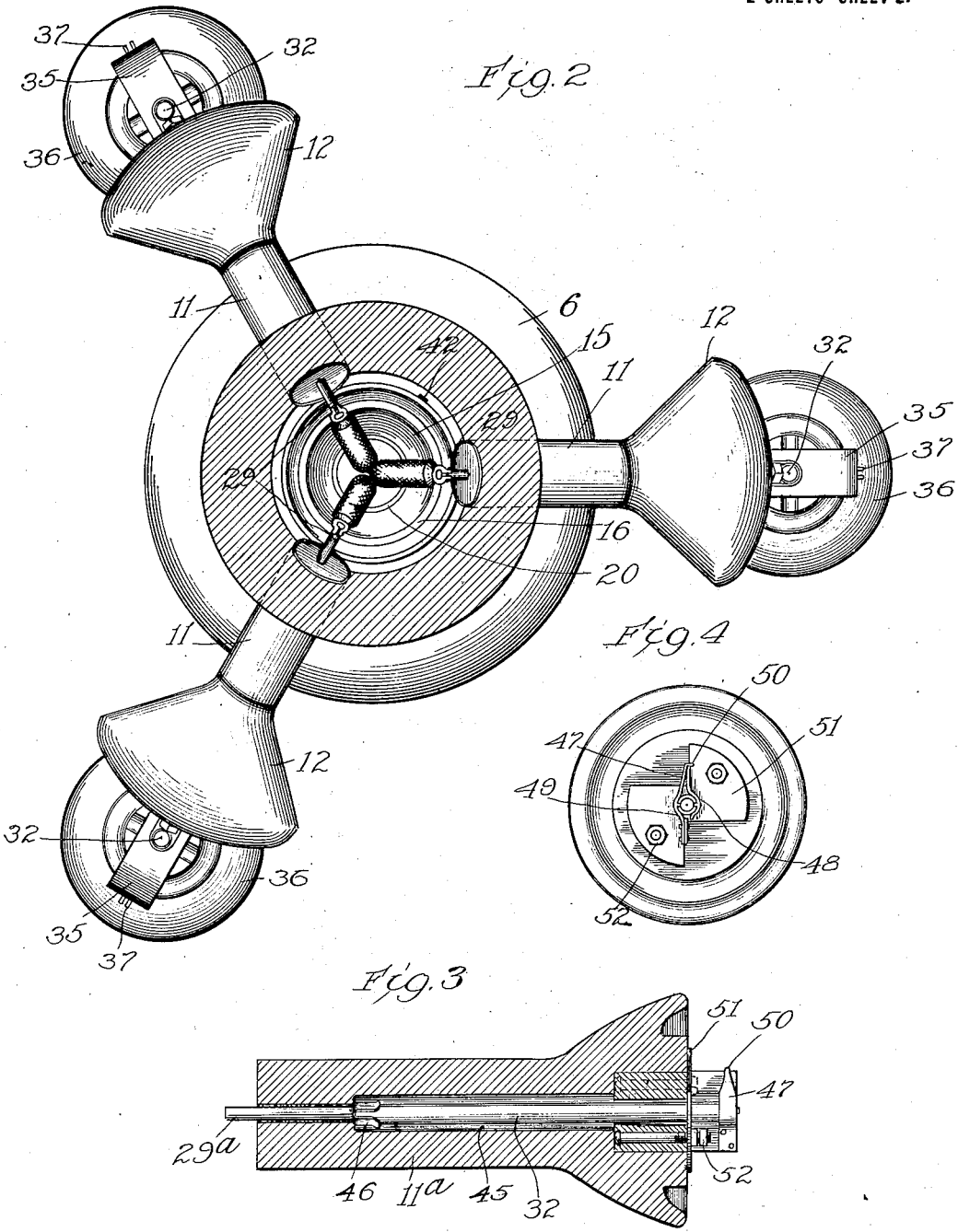

EDMUND O. SCHWEITZER, OF CHICAGO, ILLINOIS.

CABLE-TERMINAL POLE.

1,254,938.   Specification of Letters Patent.   Patented Jan. 29, 1918.

Application filed September 21, 1914. Serial No. 862,640.

*To all whom it may concern:*

Be it known that I, EDMUND O. SCHWEITZER, a citizen of the United States, residing at Chicago, in the county of Cook and State of Illinois, have invented a certain new and useful Improvement in Cable-Terminal Poles, of which the following is a full, clear, concise, and exact description, reference being had to the accompanying drawings, forming a part of this specification.

My invention relates to poles for terminating electrical cables or the like.

Prominent objects of the invention are to provide a simple and practical construction of cable terminal pole; to arrange for the termination and distribution of the cable conductors; to provide for the proper leading out and connection with the same; to arrange for the adequate and effective protection of the circuits of said cable conductors; and to secure the foregoing and other desirable results in a practical, efficient and economical manner.

In the accompanying drawings Figure 1 is a view of the top of a cable terminal pole embodying my present invention;

Fig. 2 is a horizontal section taken on line 2—2 in Fig. 1;

Fig. 3 is a longitudinal section of a modified form of a part of the device; and Fig. 4 is an end view of the same.

In the drawings, and especially in Figs. 1 and 2, I show the top of a cable terminal pole wherein is illustrated the upper end 1 of a steel or other metallic tubular or hollow cylindric pole. At the top of this pole is an end member 2 conveniently in the form of a bushing of suitable material, such for example as impregnated wood. This member 2 has its lower end adapted to fit into the upper end portion of the pole 1 and its upper end 3 is somewhat larger so as to be a little more than flush with the outer surface of said pole 1, said enlarged or upper portion being screw threaded as shown at 4. Screws 5 are shown passing through the end portion of the pole 1 to hold said member 2 in position. A pothead member or bell 6 is fitted at the upper end of the pole, being conveniently held in place by having a screw threaded socket adapted to fit upon the screw threaded end 3 of the member 2. This bell or pothead member 6 may be of any suitable material, preferably porcelain or the like. It is desirably made with more or less downwardly and outwardly flaring sides as shown in Fig. 1, and is made with a tubular bore 7 which extends up to its top forming an open end or mouth which is normally closed by a lid or cover 8. The latter is desirably provided with a threaded projection or portion 9 adapted to fit into the correspondingly threaded upper end 10 of said member 6.

Terminal outlet or entrance bushings 11 are carried by the pothead member 6, said bushings 11 being preferably made separate from the member 6 and fitted into apertures or openings in the sides of the same as shown in Fig. 1. As shown in said figure said bushings are conveniently made tubular in form with flaring ends 12. A ring-like member 15 is secured to the upper end of the portion 3 of the member 2, said member 15 being preferably made of lead or other suitable metal and having a flange 16 which fits against the end surface of the member 2 and also having a cylindrical or tubular sleeve like portion 17 adapted to surround or encircle the end of the cable sheath, with a flaring connecting portion 18 between said flange 16 and sleeve portion 17. Screws 19 are conveniently provided to pass through the flange 16 into the member 2 to hold said member 15 in position. The cable 20 is shown extending up through the pole 1 and having its upper end fitted into said sleeve portion 17 of the member 15 and its insulated conductors 21—21 extending out beyond the end of the cable sheath, which latter is preferably terminated at the sleeve portion 17. Another ring-like member 23 is also provided, the same being fitted into the lower portion of the bore or chamber 24 formed in the upper portion 3 of the member 2, said member 23 having conical sides adapted to fit the flaring sides 25 formed on said member 2. A sleeve 26 is fitted around the cable sheath and also fitted within the ring member 23, said sleeve 26 and member 23 being correspondingly tapered so as to permit the member 26 to fit firmly within the member 23. In this way the upper end portion of the cable sheath is held firmly and satisfactorily in position by a fitting which can be readily made and put together. It will be understood, of course, that other devices can be used for holding the upper end portion of the cable in position.

Within the bushings 11 rods 28 are located, said rods being preferably of copper or other suitable material which are sufficiently long to project at both ends of the bushings 11, whereby the inner ends form terminals 29 which are connected with the cable conductors 21 and also whereby the outer ends form terminals 30. These terminals 30 are shown connected as by connecting clips 31 with fuse devices 32 which may be fuse structures such as shown in Patent No. 1,008,496, issued Nov. 14, 1911, to myself and N. J. Conrad, or may be any other suitable or desired type of circuit protecting device. These fuse devices 32 are shown as extending downwardly and fitted into clips or sockets 34 carried by terminal brackets 35. The latter are mounted upon the upper ends of insulating supports 36, the brackets 35 having split ring members 37 adapted to encircle and engage the upper portions of said insulators 36. The insulators 36 are conveniently mounted upon arms 38 carried by and preferably made integral with a sleeve 39 which is fitted about the tubular pole 1. A bolt 40 is shown as one form of terminal which may be employed in connection with the terminal bracket 35 to permit connection of a line or other conductor, whereby connection may be made with the cable conductors through the devices described.

As a matter of further improvement I show a heating coil 41 located within the bore 7 of the bell or pothead member 6. This may be any suitable or preferred type of heating coil and is so designed and constructed as to be capable of softening the compound or other insulating material which I preferably place within the pothead member 6. This heating coil 41 has terminals 42 extending well up to the top of the pothead member 6 whereby connection may be made from the outside with said heating coil by removing the cover 8. This permits the heating coil to be energized and the compound within the pothead to be softened whenever desired. Some other suitable form of heating device may of course be used instead of this heating coil.

In Figs. 3 and 4 I show a modified form of outlet bushing 11ª. This bushing itself is very similar to the bushing 11 of the previously described device, but has a somewhat larger internal bore 45 for the better portion of its length. The metal rod 29ª does not extend the full length of the bushing as in the other device, but extends only part of the length and terminates in a metal socket 46. Within the enlarged bore 45 I arrange the fuse or other protective device 32, fitting one end of the same into the socket 46. The other end projects from the flared end of the bushing 11ª and is engaged by two metal clips 47 and 48. The clip 47 is hinged at 49 and provided with a spring clasp 50 adapted to engage the fixed end of the other clip 48. In this way the two clips automatically engage the end of the fuse or protective device 32 and maintain the same in position and at the same time permit disconnection and disengagement so as to remove and replace said protective device as desired. A metal plate 51 is mounted at the end of the bushing 11ª and provided with a terminal bolt 52 by which connection may be made to a line or other conductor. In case a bushing arrangement as shown in Figs. 3 and 4, is used it will not be necessary to employ the bracket arms 38 and insulator 36, the protecting device or fuse 32 being arranged within the bushing itself instead of being outside of the same and separately supported as in Fig. 1.

It will be understood that changes and modifications may be made without departing from the spirit of the invention.

What I claim is:

1. The combination of a tubular post, a pothead mounted at the upper end thereof, a cable extending up in the interior of the post and having its conductors spread within the interior of the pothead, insulating compound inside of the pothead sealing the cable conductors therein, connections extending through the walls of the pothead and connected with the ends of the cable conductors therein, protective devices located outside of the pothead and connected with the outer ends of said connecting devices, and cross arms mounted on the post below the pothead, said protective devices being supported by said cross arms.

2. The combination of a tubular member, a pothead located at the end of said member, and a plug device forming a mounting for said pothead upon said pole, said plug device being tubular and having one end portion arranged inside of and lining the end of the pole at which said pothead is located, and having its other end projecting beyond the end of said pole and fitted within the adjacent end portion of said pothead, said tubular plug device having an interior bore sufficiently large to accommodate a cable.

3. The combination of a tubular member, a plug device having one end portion fitted within said tubular member and a pothead device mounted upon the other end portion of said plug device, and securing means passing through said tubular member and engaging said plug device for holding the same in position.

4. The combination of a tubular post, a pothead member mounted upon said post and having an interior chamber, and a heating device arranged within said chamber.

5. The combination of a tubular post, a pothead member mounted upon said post and having an interior chamber, and an electrical heating device arranged within said chamber.

6. The combination of a tubular post, a pothead member mounted upon said post and having an interior chamber, and an electrical heating device arranged within said chamber, said heating device having terminals extended to an open end of said chamber and a lid or cover opening and closing said open end of said chamber.

7. The combination of a pothead member having an interior chamber which contains an electrical heating device for heating insulating material.

8. The combination of a pothead member having an interior chamber to receive ends of cable conductors, outlet bushings for connection with said conductors, said outlet bushings being at the side of said pothead member and the interior chamber of said member extending upwardly to the top thereof and opening at the top, a lid or cover for closing the open end of said chamber, and a heating coil arranged within said chamber and having terminals at the upper end of said chamber.

9. The combination of a tubular post, a plug member having a portion adapted to fit into the upper end of said post and also having a projecting end portion, a pothead mounted upon the upper end of said plug member, and a cable holding member 15 having flanges 16 adapted to fit against the end face of said plug member, and also having a sleeve portion 17 adapted to encircle the upper end of a cable sheath.

10. The combination of a tubular post, a plug member fitted into the upper end portion of said post, a pothead mounted upon the upper end of said plug member, a sleeve 26 adapted to surround an upper end portion of a cable sheath, and a collar 25 adapted to surround said sleeve 26 and having its outer side tapering, the inner surface of said collar and the outer surface of said sleeve being correspondingly tapered, and the inner surface of said plug member being tapered to correspond with the outward taper on said collar 25.

11. The combination of a tubular post, a pothead mounted thereon and having outlets, and protective devices mounted on said post and connected with conducting members extending through said outlets, said post being provided with arms carrying insulators supporting said protective devices.

12. The combination of a tubular post, a mounting device at the upper end of said post, a pothead mounted on said mounting device, said mounting device being tubular to accommodate a cable, and means extending across the upper end of the bore of said mounting device for closing the same, said means being located within said pothead.

13. The combination of a tubular post, a mounting device at the upper end of said post, said mounting device being tubular to accommodate a cable, a pothead mounted upon said mounting device, and means within said pothead and extending across the upper end of the bore of said mounting device for closing the same, said closing means being adapted to permit insulating compound inside of the pothead to have access to the end of a cable arranged inside of said mounting device.

14. The combination of a tubular post, a tubular mounting device at the upper end of said post, a pothead mounted upon said mounting device, means located within the pothead and extending across the upper end of said mounting device for closing the tubular bore thereof around a cable located therein, and supplemental closing means located in the tubular bore of said mounting device below said first mentioned closing means.

15. The combination of a tubular post, a tubular member at the upper end of said post, a pothead at the upper end of said tubular member, means located within the pothead and extending across the upper end of the tubular member for closing the bore thereof around a cable located in said tubular member, and supplemental means closing the tubular bore of said tubular member around said cable below said aforesaid closing means, said first mentioned closing means comprising a metal bracket mounted upon the upper end of said mounting member and closing the same except for a central opening to accommodate the cable and said supplemental closing means comprising an annular member surrounding the cable and extending to the surface forming the bore of said mounting member.

16. A pothead having an interior chamber provided with insulating material and a heating device consisting of a coil of wire arranged within said insulating material and having ends extending outside of said material for exterior connection with said heating coil.

17. A pothead having an interior chamber provided with insulating material and a heating device consisting of a coil of wire arranged within said insulating material and having ends extending outside of said material for exterior connection with said heating coil, the upper end of said pothead being open and being provided with a removable cover and said exposed conductor ends being located at said open end.

18. The combination of a tubular post, a pothead mounted thereon and provided with outlets, a cable extended up within the post and having its conductors spread within the pothead, connections extending through the outlets and connected within the pothead to the ends of the cable conductors, protective devices connected with the outer ends of said connections, and means carried by the post for supporting said protective devices, said means comprising cross arms on the post and insulators mounted on said cross arms and provided with means for the attachment of the protective devices.

19. The combination of a tubular post, a pothead mounted thereon and provided with downwardly extending side outlet devices, a cable extending up within the post and having its conductors spread within the pothead, metallic connections extending through the pothead outlets and connected at their inner ends with the ends of the cable conductors, fuse devices connected with the outer ends of said connections and extending downwardly therefrom, and means on said post for supporting and insulating the lower ends of said fuses.

20. The combination of a post, a pothead mounted thereon, a cable having its conductors spread within the interior of the pothead, and provided with conductive extensions extending out through the walls thereof, protective devices connected to the outer ends of said conductive extensions, and means on the post for supporting said protective devices.

21. The combination of a tubular post, a tubular supporting member at the upper end of said post, a pothead mounted on the upper end of said tubular supporting member, a cable extending up within the interior of said post and having its conductor spread within said pothead, means for closing the upper end of said tubular supporting member, and cable holding means located within said supporting member below said closing means.

22. The combination of a tubular post, a tubular supporting member at the upper end of said post, a pothead mounted on the upper end of said tubular supporting member, a cable extending up within the interior of said post and having its conductor spread within said pothead, means for closing the upper end of said tubular supporting member, cable holding means located within said supporting member below said closing means, and insulating compound inside of the pothead sealing the cable conductors and said closing means.

In witness whereof, I hereunto subscribe my name this 18th day of September, A. D., 1914.

EDMUND O. SCHWEITZER.

Witnesses:
A. LYDA JONES,
HAZEL ANN JONES.